Sept. 28, 1937. S. G. SWANSON 2,094,418
AUTOMATIC TRANSMISSION
Filed Feb. 5, 1934 5 Sheets-Sheet 1
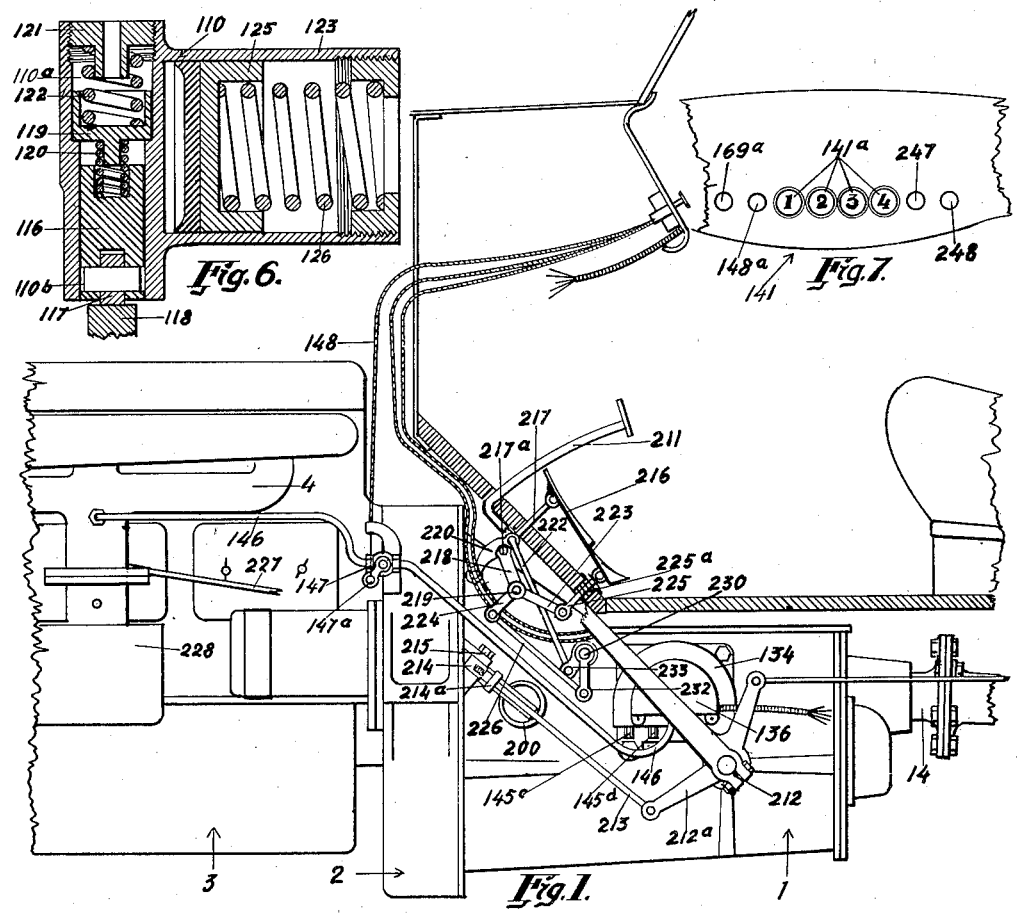
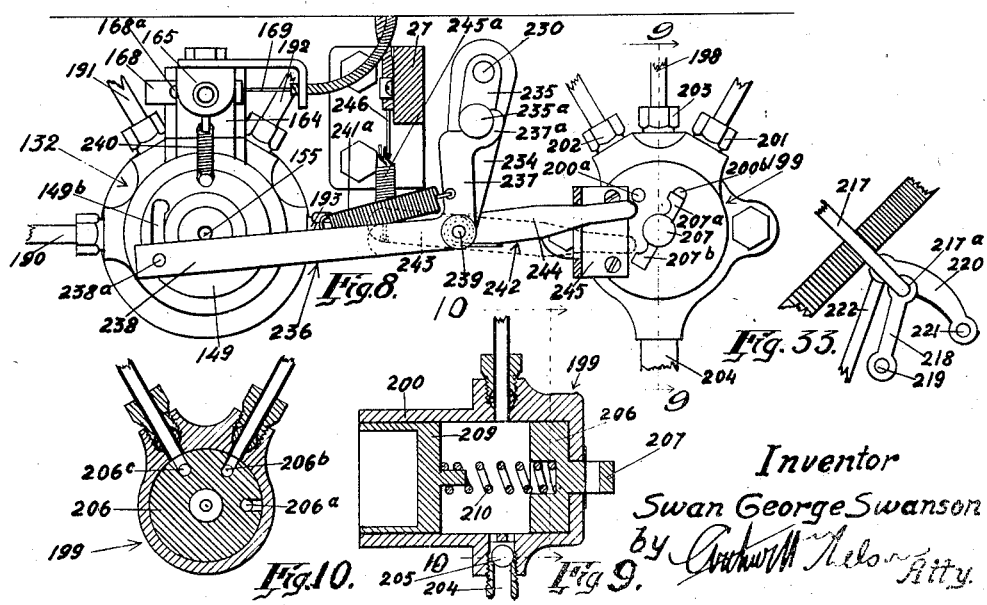
Inventor
Swan George Swanson

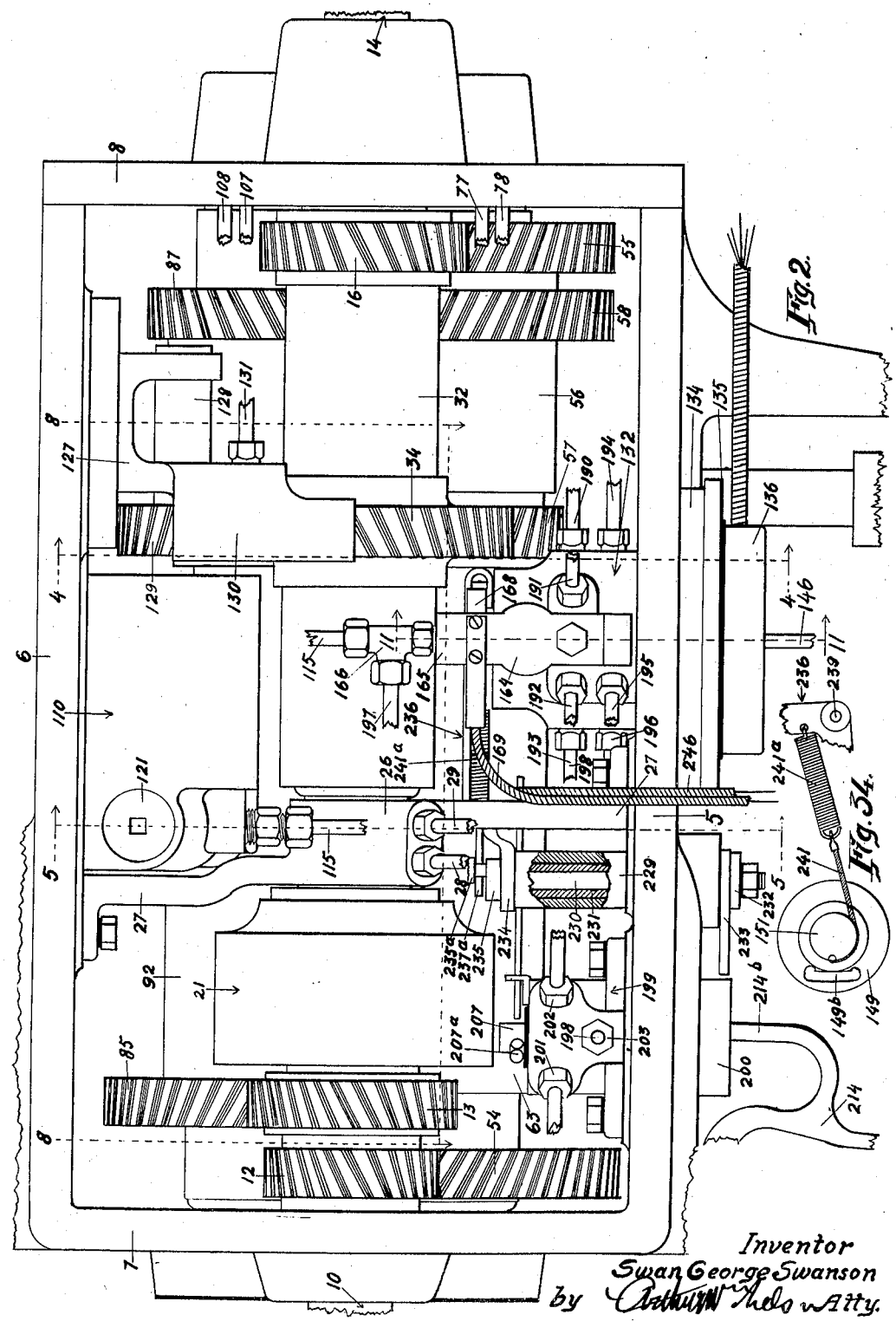

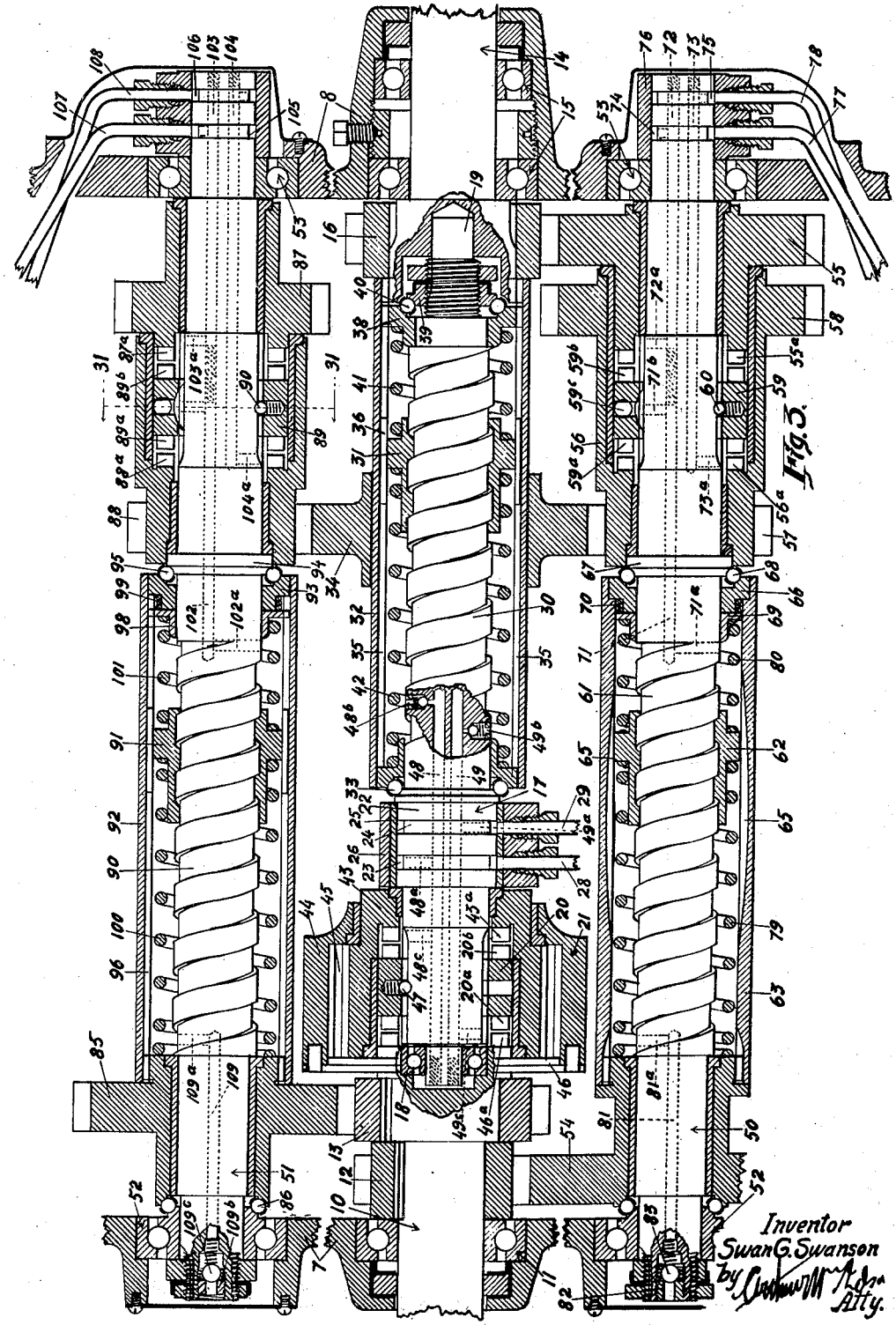

Inventor
Swan George Swanson

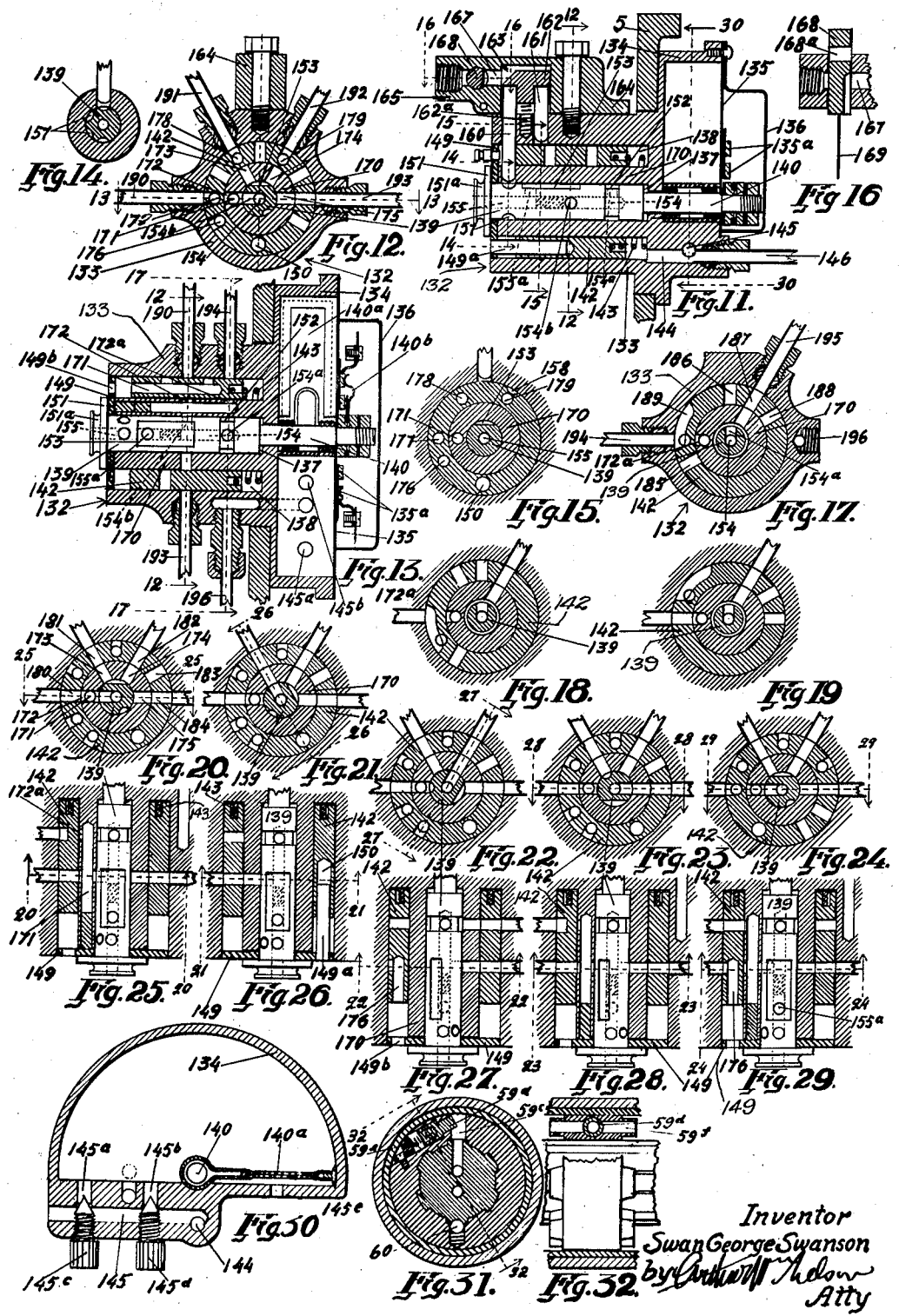

Patented Sept. 28, 1937

2,094,418

UNITED STATES PATENT OFFICE 2,094,418

AUTOMATIC TRANSMISSION

Swan George Swanson, Chicago, Ill.

Application February 5, 1934, Serial No. 709,709

31 Claims. (Cl. 74—364)

This invention relates to improvements in automatic transmissions and it consists of the matters hereinafter described and more particularly pointed out in the appended claims.

One of the objects of the present invention is to provide a transmission especially adapted for use in automotive vehicles and in which the various speeds are obtained automatically in response to movement of the accelerator pedal through means other than mechanical connections between said pedal and the gears of the transmission.

A further object of the invention is to provide a transmission for this purpose which eliminates the necessity of the main driving clutch and actuating pedal usually associated with the engine fly wheel as found in the conventional automotive vehicle.

Another object of the invention is to provide a transmission of this kind in which the gears are in constant mesh and are so arranged as to yield four speeds forward and one in reverse, with free wheeling being optional in the high speed ratio or direct drive.

A further object of the invention is to provide a transmission of this kind wherein the various gears are connected to the respective shafts by fluid pressure actuated means and which means is controlled by vacuum operated means that is responsive to accelerator pedal actuation to progressively bring in the different forward speeds.

Still another object of the invention is to provide an automatic transmission including means whereby during a standstill period of the vehicle, the transmission may be set in fourth speed or direct so as to make it possible to start the engine of the vehicle by pushing or pulling the vehicle.

Still a further object of the invention is to provide a vacuum controlled, automatic transmission of this kind, wherein it is possible to shut off the vacuum produced by the inlet manifold from the control mechanism of the transmission so that the engine may be run at idling or other speeds for the purpose desired without driving the vehicle through the transmission.

Another object of the invention is to provide a transmission of this kind, wherein the shift is accomplished through an actuating force controlled by varying the vacuum in the intake manifold and in a part connected to one of the shafts of the transmission.

A further object of the invention is to provide a transmission of this kind wherein power is transmitted to the driven shaft during the change from one speed to another as afforded by the transmission, so that no power jerk or surge is present in said change from one speed to another.

The above mentioned objects of the invention as well as others, together with the several advantages thereof, will more fully appear as I proceed with my specification.

In the drawings:

Fig. 1 is a view in elevation of the left hand side of a transmission embodying the preferred form of the invention and shows the same in connection with more closely associated parts of the vehicle, as well as certain manually actuated parts thereof.

Fig. 2 is a top plan view of the transmission on an enlarged scale with the cover plate removed to better show the interior construction of the transmission.

Fig. 3 is a horizontal, longitudinal sectional development view though the various shafts of the transmission.

Fig. 6 is a vertical sectional view of a certain fluid pressure producing pump embodied in and driven by a part of the transmission and the purpose of which will more fully appear later, the plane of the section being indicated by the line 6—6 of Fig. 5.

Fig. 7 is a fragmentary view in front elevation of the instrument board of the vehicle and illustrates certain parts to be manipulated in the operation of the transmission, as well as illuminated means whereby the operator is advised as to what forward speed the transmission happens to be in.

Fig. 8 is a fragmentary view in elevation, of certain controlling mechanism for and located in the transmission and as viewed in the direction of the lines 8—8 of Fig. 2.

Fig. 9 is a longitudinal vertical sectional view through a certain pressure fluid distributing valve employed in the transmission as taken on the line 9—9 of Fig. 8.

Fig. 10 is a transverse vertical sectional view through the valve shown in Fig. 9 as taken on the line 10—10 of said Fig. 9.

Fig. 11 is a longitudinal vertical sectional view through a certain vacuum operated, controlling valve embodied in the transmission, whereby the passage of fluid under pressure is distributed to the various clutches so that the gears of the transmission may be connected to and disconnected from their associated shafts.

Fig. 12 is a transverse vertical detail sectional view through a part of the valve structure shown in Fig. 11 as taken on the line 12—12 of Fig. 11.

Fig. 13 is a horizontal detail sectional view through the valve structure shown in Figs. 11 and 12, the plane of the section being indicated by the line 13—13 of Fig. 12.

Fig. 14 is a vertical detail sectional view through another part of the valve structure shown in Fig. 11 as taken on the line 14—14 of Fig. 11.

Fig. 15 is a transverse vertical sectional view through another part of the valve structure shown in Fig. 11 as taken on the line 15—15 of Fig. 11.

Fig. 16 is a horizontal detail sectional view through a part of said valve structure as taken on the line 16—16 of Fig. 11.

Fig. 17 is a vertical transverse sectional view through a part of the said valve structure as taken on the line 17—17 of Fig. 13.

Figs. 18 and 19 are views similar to Fig. 17, showing the valve parts in different positions.

Fig. 20 is a transverse vertical detail sectional view through a part of the valve as taken on the line 20—20 of Fig. 13 and shows the valve in a position which will produce first speed forward in the transmission.

Figs. 21, 22, 23 and 24 are detail sectional views similar to Fig. 20 and show the parts in changed positions producing second, third and fourth or direct speed forward and reverse in the transmission.

Figure 4:
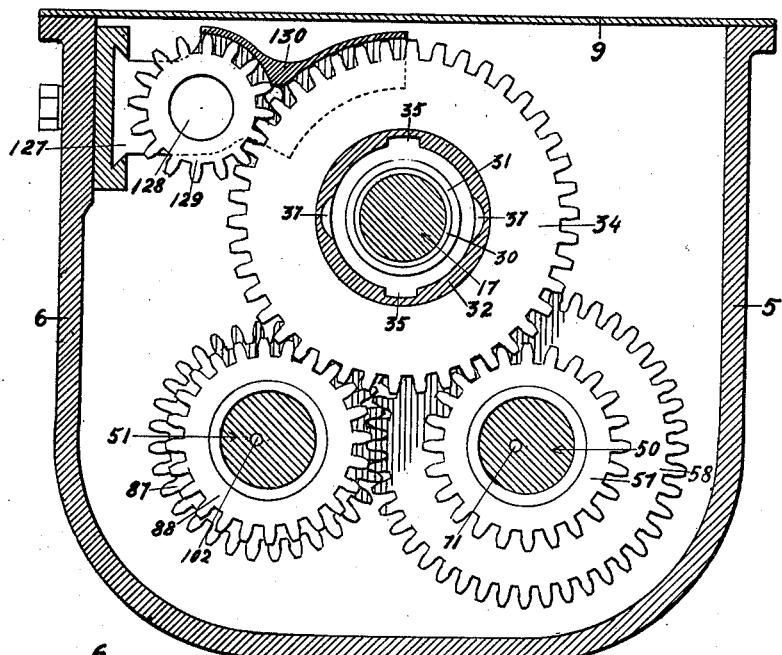
Fig. 4 is a transverse vertical sectional view through a part of the transmission as taken on the line 4—4 of Fig. 2.

Figs. 25, 26, 27, 28 and 29 are detail horizontal sectional views through Figs. 20 to 24 inclusive as taken on the lines 25—25 of Fig. 20, 26—26 of Fig. 21, 27—27 of Fig. 22, 28—28 of Fig. 23 and 29—29 of Fig. 24 respectively.

Fig. 30 is a transverse vertical sectional view through the vacuum equalizing chamber of the valve structure shown in Fig. 11 as taken on the line 30—30 of said Fig. 11.

Fig. 31 is a transverse vertical sectional view through a certain shiftable clutch embodied in the transmission as taken on the line 31—31 of Fig. 3.

Fig. 32 is a detail longitudinal vertical sectional view through a part of the structure shown in Fig. 31 as taken on a part of the line 32—32 thereof, a part of the clutch element proper being illustrated in elevation to better show the formation of its clutch teeth.

Fig. 33 is a detail view in elevation on an enlarged scale, of parts actuated in the depression of the toe end of the accelerator pedal shown in Fig. 1.

Fig. 34 is a detail view in elevation of parts appearing in Fig. 8 and which will be more fully referred to later.

Referring now in detail to that embodiment of the invention, illustrated in the accompanying drawings:

1 indicates, as a whole, the casing of the transmission which has a bolted-on connection at its front end with the fly wheel housing 2 of an associated engine 3, the conventional clutch and its housing being eliminated. The engine 3 includes the usual inlet manifold 4.

The transmission casing 1, which is open at the top, includes spaced side walls 5 and 6 respectively, and front and rear end walls 7 and 8 respectively, there being a cover 9 to close the open top of the casing.

10 indicates the drive shaft of the transmission which is operatively connected at its front end to the crank shaft of the engine. Said shaft 10 may constitute a rear end extension of the crank shaft or it may constitute a separate shaft, splined or otherwise connected to said crank shaft. The rear end of the shaft 10, which is journalled in bearings 11 in the front wall 7 of the casing, has secured thereto within the casing, the gears 12 and 13 respectively.

14 indicates the driven shaft of the transmission, which is arranged in alignment with the drive shaft and is journalled in the bearings 15 in the rear end wall 8 of the transmission casing. On the front end of the driven shaft within the casing is a gear 16. Arranged between the shafts 10 and 14 is a power transmitting shaft 17, the front end of which is reduced in diameter to engage in a bearing 18 located in a suitable recess in the rear end of the drive shaft. The rear end of said shaft 17 is also reduced in diameter as at 19 for engagement in a recess in the front end of the driven shaft 14.

The front end of the shaft 17, just to the rear of the bearing 18, is splined for engagement with a shiftable clutch collar 20. This collar has clutch teeth 20a and 20b respectively, whereby an associated overrunning or free wheeling clutch, indicated as a whole at 21, may be connected to, or disconnected from, the shaft as will later appear. To the rear of said clutch, this shaft is provided with an enlargement 22, in which are formed two annular grooves 23 and 24 respectively. This enlargement is journalled in a bushing 25 that is supported by a collar 26 forming part of a transversely extending bracket 27 (see Fig. 2) which is securely fixed at its ends to the side walls of the casing. Secured in said collar so as to communicate with the grooves 23—24, are conduits 28 and 29 respectively.

The shaft 17 to the rear of its enlargement is formed with a helical portion 30 on which is engaged a traveler or nut 31. A sleeve 32 surrounds this helical portion of the shaft and this sleeve is journalled at its front end on the shaft 17 by bearings 33 disposed near the enlargement 22 of said shaft. The rear end of said sleeve is fixed to the driven shaft in any suitable manner and on said sleeve, at a point between its ends, is a gear 34. The sleeve 32 is provided with diametrically opposite longitudinally extending, internal grooves 35—35 in which splines 36 on the traveler or nut 31 engage and whereby the sleeve and traveler are caused to rotate together. Also, in said sleeve and arranged at a right angle to the plane of the grooves 35—35, are other and shorter longitudinal grooves 37 (see Fig. 4) which terminate short of the ends of the sleeve. By means of said grooves 37, a certain pressure fluid, with which the sleeve is filled, can pass from one end to the other of the sleeve while the nut is traveling on the intermediate part of the helical portion 30.

In the rear end of said sleeve and rotatable therewith, but immovable longitudinally thereof, is a collar or race 38 to coact with a race 39 and associated balls 40 to provide an antifriction bearing. Surrounding the helical portion 30 of the shaft 17 and abutting at one end against the collar 31 and abutting at the other end against the collar 38 and front end closure of the sleeve 32 are springs 41 and 42 respectively. The antifriction bearing as provided by the collar 38, race 39 and balls 40, takes up the endthrust as exerted by the spring 41. In the initial part of the rotation between the sleeve 32 and shaft portion 30, it is apparent that the nut 31 is caused to travel longitudinally in the proper direction. In this movement, the pressure fluid by-passes through the grooves 37, past the nut from one end to the other of said sleeve. So soon as the nut passes beyond the ends of the groove 37, this movement of the nut is cushioned to a stop to provide an operative driving connection between the sleeve 32 and shaft 17, as a whole.

The overrunning clutch 21, before mentioned, includes an inner clutch member 43 and an outer clutch member 44. Between said clutch members are coacting clutch elements 45 which in a relative rotation between said clutch members in one direction, operatively connect them together. The inner clutch member 43 which is journalled on the shaft 17 encloses the shiftable clutch collar 20 and has end teeth 43a for operative engagement by the teeth 20b of the clutch collar 20 when the same is shifted rearwardly. The outer clutch member 44 is operatively connected at its front end to a radial flange 46 on the rear end of the drive shaft 10 and this flange is provided with clutch teeth 46a for engagement by the teeth 20a of the clutch collar 20 when said clutch collar is shifted forwardly. The clutch collar 20 is provided with a spring pressed ball detent 47 to hold it in an intermediate or neutral position with respect to the clutch teeth 43a—46a. When the clutch collar is shifted rearwardly, the shaft 17 is driven from the drive shaft through the overrunning clutch and when the clutch collar 20 is shifted forwardly, the shaft 17 is driven positively from the shaft 10 and the overrunning clutch is locked out of operation.

The clutch collar 20 is shifted in the proper direction by means of a fluid under pressure and for this purpose the shaft 17 is provided in its front end with two longitudinal passages 48 and 49 respectively. These passages communicate at a point between their ends by means of ports 48a and 49a with the annular grooves 23—24, with which the conduits 28—29 communicate. The rear end of these passages open into the interior of the sleeve 32 by means of check valved ports 48b and 49b respectively. The front ends of said passages are suitably plugged. The passage 48 opens by means of a port 48c into the space to the rear of the clutch collar 20 and the passage 49 opens by means of a port 49c into the space to the front of the collar 20. It is apparent that when fluid under pressure is admitted to one or the other of the passages 48—49, the clutch collar 20 is shifted forwardly or rearwardly as the case may be.

Figure 5:
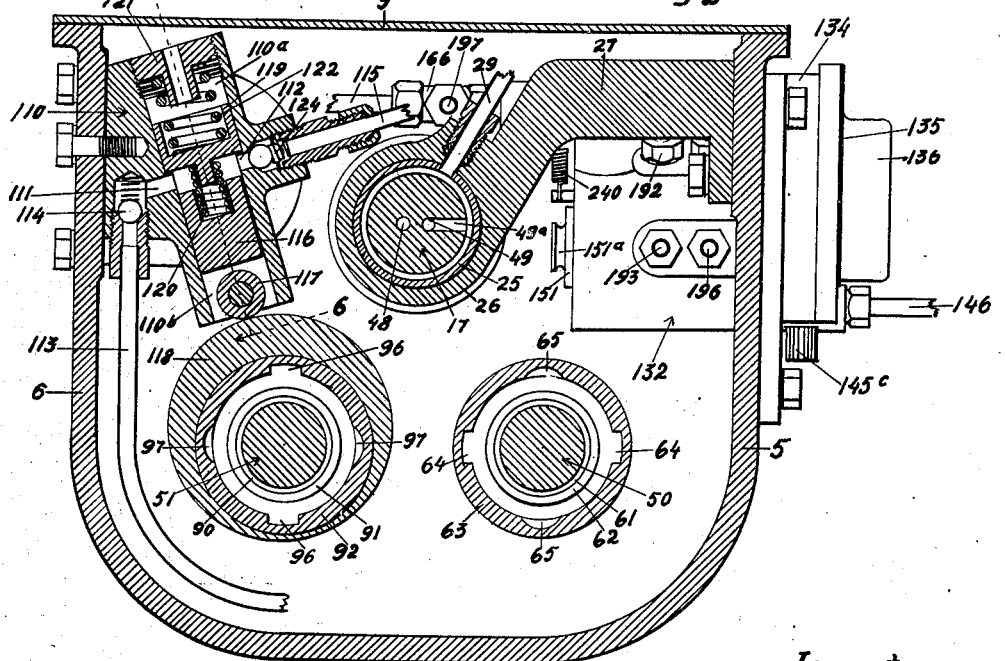
Fig. 5 is another transverse vertical sectional view through the transmission as taken on the line 5—5 of Fig. 2.

50 and 51 respectively, indicate the two jack shafts of the transmission. Said shafts are arranged below, and one in a plane to each side of the plane of the drive shaft 10, as best shown in Figs. 4 and 5. The shafts 50 and 51 are journalled at their front and rear ends in antifriction bearings 52 and 53 respectively, in the front and rear end walls of the transmission casing. Journalled on the front end of the shaft 50 is a gear 54 that is in constant mesh with the gear 12 on the drive shaft. Journalled on the rear end of said shaft is a gear 55 that is in constant mesh with the gear 16 on the driven shaft of the transmission. The front end of the hub of the gear 55 is formed with positive clutch teeth 55a. Also on the rear end of said shaft is a sleeve 56 having front and rear end gears 57 and 58 respectively, the former being in constant mesh with the gear 34 before mentioned and the latter being in constant mesh with a reverse idler gear on the shaft 51, as will later appear. The sleeve 56 is provided with positive clutch teeth 56a.

Splined on the rear end of the shaft between the clutch teeth 55a and 56a is a clutch collar 59 having clutch teeth 59a and 59b. These teeth are adapted for engagement with the first mentioned clutch teeth when said collar has been shifted forwardly or rearwardly from its neutral position and in which neutral position it is yieldingly held by a spring pressed detent ball 60.

The shaft 50 is provided with a helical spline portion 61 upon which is engaged a traveler or nut 62. Surrounding this portion of the shaft is a sleeve 63 provided with oppositely disposed, longitudinal extending, internal grooves 64 in which splines on the nut engage. These grooves are best shown in Fig. 5. Also in said sleeve and arranged in a plane at a right angle to that of the grooves 64, are longitudinal grooves 65 that terminate short of the ends of the sleeve. These grooves 65 permit the passage of a fluid in the sleeve from one end to the other thereof, as the nut 62 moves longitudinally on the splined portion 61 of the shaft 50.

The front end of the sleeve 63 is fixed to the hub of the gear 54, while the rear end of said sleeve is provided with a collar 66 that is journalled on the shaft 50 adjacent an annular shoulder 67 thereon. The collar and shoulder are formed to receive balls 68 that provide an antifriction thrust bearing for the rear end of the sleeve on the shaft 50. Mounted upon the shaft 50 forwardly of the collar 66, is a slidable port controlling ring 69 and between said ring and collar is a spring 70 that normally tends to move the ring forwardly toward port closing position.

In the rear end of the shaft 50 are provided longitudinal passages 71—72 and 73 respectively, with the passages 71 and 72 in alignment. The passages 72—73 each communicates at its rear end with an annular groove 74—75 respectively, in the extreme rear end of the shaft beyond the bearing 53. This end of the shaft is surrounded by a boss 76 and secured therein are conduits 77—78 that open into and communicate with the grooves 74 and 75 respectively. The front end of the passage 72 opens by a lateral port 72a into the space between clutch teeth 55a and 59b and the front end of the passage 73 opens by a lateral port 73a into the space between the clutch teeth 56a and 59a. The front end of the passage 71 opens by a lateral port 71a into the interior of the sleeve 63 just forward of the valve ring 69, while the rear end of said passage opens laterally through a port 71b into a chamber 59c in the clutch collar 59.

Springs 79 and 80 respectively, surround the shaft part 61 between the nut 62 and the rear end of the gear 54 and the valve ring 69 respectively. When the nut 62 travels rearwardly and comes into engagement with the spring 80, this causes the valve ring 69 to uncover the port 71a. This opens the port so that the fluid to the rear of the nut enters the passage 71 to pass to a valved port 59c (see Fig. 32) in the clutch member 59. When fluid under pressure comes into contact with the valve plug 59d, this pushes the same inwardly against the action of a spring 59e so that the port 59f is opened. Thus the fluid at either end of the clutch collar may pass through the collar to release the same from the clutch teeth 55a—56a with which it was engaged. Thus the fluid under pressure is by-passed through the clutch to release the same after an operation and to return the collar to a neutral position. The valve ring 69 remains in an open position until the tension on the spring 80 by the nut 62 is released, when the spring 70 causes the valve ring to move forwardly and close off the port 71a.

In the front end of the shaft 50 is a longitudinal passage 81 that opens at its rear end through a lateral port 81a into the interior of the sleeve 63. Said passage opens at its front end into a fitting 82 that includes a check valve 83. This fitting in turn, opens into the casing 1. In the rearward movement of the traveler or nut 62 on the shaft 50, lubricant is drawn into said fitting to pass through the passage 81 for delivery into the interior of the sleeve 63.

On the front end of the shaft 51 is journalled a gear 85 that is in constant mesh with the gear 13, and an antifriction thrust bearing 86 is provided for said gear in connection with the bearing 52. On the rear end of said shaft is journalled a gear 87, the front end of which is formed to provide clutch teeth 87a. This gear 87, which constitutes the reverse idler gear, is in constant mesh with the gear 58, although it is not so shown in Fig. 3 because of the character of said figure which is a laid out flat development of the various shafts and parts thereon, of the transmission.

Journalled on the shaft 51 forward of the gear 87 is another gear 88 that is in constant mesh with the gear 34 before mentioned. The gear 88 is provided at its rear end with clutch teeth 88a and said rear end is made as a sleeve to enclose a shiftable clutch collar 89 that is splined to the shaft for a shifting movement between the sets of clutch teeth 87a—88a. The clutch collar 89, which is provided with a spring pressed ball detent 90 for yieldingly holding it in the neutral position, is formed at its ends with clutch teeth 89a—89b. When the collar is shifted forwardly to engage the teeth 88a—89a, this connects the gear 88 to the shaft 51. When the collar is shifted rearwardly to engage the teeth 87a—89b, this connects the gear 87 to the shaft 51.

The shaft 51 has a helical spline portion 90 between the gears 85 and 88, upon which is engaged a traveler or nut 91 similar to the ones 31—62, before mentioned. Surrounding this portion of the shaft is a sleeve 92 which is fixed at its front end to the gear 85 and carries a collar 93 at its rear end that is journalled on the shaft 51 near an annular shoulder 94 thereon. Between said collar and shoulder are balls 95 providing an endthrust bearing for the sleeve.

The nut 91 is provided with splines for a guided engagement in oppositely disposed longitudinally extending, internal grooves 96 (see Fig. 5) in the sleeve 92. Said sleeve is also provided, in a plane at a right angle to that of the grooves 96, with a pair of by-pass grooves 97 (see Fig. 5) which terminate short of the ends of the sleeve. Loose on the shaft just forward of the collar 93, is a port controlling valve ring 98, there being a spring 99 interposed between the collar and ring which normally tends to urge said ring forwardly toward port closing position, as will soon appear.

Springs 100 and 101 surround the shaft portion 90 and engage at one end with the nut 91 and engage at their outer end with the gear 85 and valve ring 98 respectively.

In the rear end of the shaft are formed passages 102, 103 and 104 respectively, the passages 102—103 being in alignment. The passages 103—104 open at their rear end by suitable ports into annular grooves 105 and 106 provided in the rear end of the shaft beyond the bearing 53. A collar surrounds this end of the shaft and secured in said collar are conduits 107—108 respectively, that communicate with said grooves 105—106.

The passage 103 opens at its front end by a lateral port 103a into the space between the clutch teeth 87a—89b, while the passage 104 opens at its front end by a lateral port 104a into the space between the clutch teeth 88a—89a. The passage 102 opens at its front end into the sleeve 92 just forward of the valve ring 98 by means of a lateral port 102a and opens at its rear end into a chamber in the clutch collar 89. This collar is provided with a valved port and lateral passages similar to those (59d and 59c) mentioned in connection with the clutch collar 59. This passage 102 operates when the nut 91 is moving rearwardly and when the clutch has once been shifted either forwardly or rearwardly, to release the actuating pressure therefor. Thus said clutch collar may return to neutral, the valve ring 98 being kept in its port opening position until the tension on the spring 101 has been released and the spring 99 is again capable of moving the valve ring to its port closing position.

In the front end of the shaft 51 is provided an axial passage 109 which opens at its rear end into the interior of the sleeve 92 by a lateral port 109a. The front end of said passage communicates with a fitting 109b on the front end of the shaft 51 and in which is provided a check valve 109c. As best shown in Figs. 4 and 5, the shafts 50 and 51 are arranged in the bottom portion of the casing so that the fittings 82 and 109b thereof will be immersed in the lubricating fluid with which the casing is filled to the desired level. Thus, each time the nuts 62 and 91 travel rearwardly on the respective shafts, they will act to draw into the associated sleeves 63 and 92, an amount of said lubricant that will keep the said sleeves properly filled therewith.

The transmission thus far described is capable of providing four speeds forward and one reverse and a free wheeling action is optional in the high speed which is a direct drive between the shafts 10 and 14 through the shaft 17. It is also apparent that the transmission is a constant mesh transmission and that the means for operatively connecting the various gears to the associated shafts, constitute clutches which are shifted in the desired direction by means of a fluid under pressure. This fluid is preferably a part of the lubricant with which the transmission is filled and is circulated under pressure by means of a pump embodied in the transmission, as will later appear.

To provide first speed forward, the clutch collar 59 is shifted forwardly to connect the sleeve 56 and its gears 57—58 to the shaft 50. Thus the drive is from the shaft 10 through the gears 12 and 54 to the sleeve 63 and from the sleeve through the traveler or nut 62 to the shaft 50. As the sleeve 56 is now locked to the shaft 50, the drive continues from the shaft 50 to the gear 57 into the gear 34 to the sleeve 32 and into the shaft 14 to which it is connected. While certain other of the gears may be driven at this time, they will merely turn idly upon the respective shafts.

To provide second speed forward, the clutch collar 89 is shifted forwardly to connect to gear 88 the shaft 51. Thus the drive is from the shaft 10 through the gears 13 and 85 to the tube or sleeve 92 and from said sleeve to the traveler or nut 91 to the shaft 51. As the gear 88 is now fixed to the shaft, the drive continues through the gear 88 to gear 34 and through the tube or sleeve 32 to the shaft 14.

To provide third speed forward, the clutch collar 59 is moved rearwardly to operatively connect the gear 55 to the shaft 50. Thus the drive is from the shaft 10 to the gears 12 and 54, through the sleeve 63 and traveler or nut 62 to the shaft 50. As the gear 55 is now connected to said shaft, the drive continues through said gear to the gear 16 on the driven shaft and then out through said driven shaft 14.

To provide fourth speed or direct drive, without free wheeling, the clutch collar 20 is shifted forwardly to connect the shaft 17 to the disc 46. Thus the drive is from the shaft 10 through the disc 46 and clutch collar 20 to the shaft 17 and from said shaft through the traveler or nut 31 to the sleeve 32. As this sleeve is fixed at its rear end to the shaft 14, the drive continues out through said sleeve to said shaft.

To provide fourth speed forward or direct drive, with free wheeling, the clutch collar 20 is shifted rearwardly to connect the inner clutch member 43 to the shaft 17. Thus the drive is from the shaft 10 through the disc 46 to the outer clutch 44 of the free wheeling mechanism and then through the elements 45 to the inner clutch member 43 to the shaft 17. From said shaft 17 the drive continues through the nut 31 to the sleeve 32 to the shaft 14. Should the shaft 14 overrun the shaft 10, the differential of speed is compensated for by the elements 45, between the clutch members 43—44.

To provide a reverse drive for the shaft 14, the clutch collar 89 is shifted rearwardly to connect the gear 87 to the shaft 51. Thus the drive is from the shaft 10 through the gears 13 and 85 to the sleeve 92 and through the traveler or nut 91 to the shaft 51. The drive then continues through the clutch collar 89 to the gear 87 to the gear 58, sleeve 56 and gear 57 to the gear 34. As this gear is fixed to the sleeve 32 and as said sleeve is also fixed to the shaft 14, the latter is driven in a reverse direction.

It is apparent from the foregoing that the drive shaft picks up the shafts 17, 50 and 51 for the transmission of power thereto, through a cushion not only provided by the associated springs 42—79 and 100 but also by the by-passed lubricant in the respective sleeves, due to the action of the associated travelers or nuts.

When power is reversed or applied while the drive shaft 10 is idling and the momentum of the driven shaft 14 is in excess to the power of the drive shaft, the reversed power is transmitted from the shaft 14 through gear 16 and 55 to clutch collar 59 to the shaft 50. This power is further transmitted by said shaft to the nut 62 through cushion spring 80 to sleeve 63 gears 54 and 12 to shaft 10. Reverse power operation upon the cushioning means associated with the shafts 50 and 51, functions in a like manner as above mentioned.

It is pointed out at this time that power is reversed on the shafts 50 and 51 only when the speeds ahead are in locked position, otherwise the clutch collars 59 and 89 respectively, associated with said shafts are automatically disengaged due to the angularity of the faces of their teeth as distinguished from straight dental tooth clutch teeth.

When either of the clutch collars 59—89 have been shifted in the desired position, said collar remains in said position until the pressure which caused its movement is released. This releasing of pressure is produced by the movement of the associated valve ring 69—98. This opens the associated port 71a—102a so that fluid under pressure passes through associated passages 71—102 and into the chamber of the associated clutch collar. From this chamber the fluid passes endwise through the valves in the collar when due to the angularity of the faces of the respective clutch teeth, the collar will automatically move back to neutral position to be yieldingly held therein by the associated detents 60 or 90 as the case may be. The valve ring 69—98 will remain in its port opening position until tension on the associated spring 80—101 is released when said ring is returned to its port closing position by means of its associated spring 70 or 99 as the case may be.

This action occurs only as the speeds are changed from the lower to the higher ranges. When the speeds are changed in the reverse order, then the clutch collar 60 or 89 is immediately and automatically kicked back to neutral position.

Fluid under pressure heretofore mentioned (and except as where otherwise mentioned herein) is provided by means of a pump as best shown in Figs. 5 and 6. On the inside of the wall 6 of the transmission casing is located pump 110 including a bracket provided with a bore having top and bottom portions 110a and 110b respectively, of different diameters. As shown in Fig. 5, the axis of said bore is inclined to the perpendicular and is radial with respect to the axis of the shaft 51. Near the top end of the bore parts are provided inlet and outlet ports 111 and 112 and connected to the inlet port is a conduit 113 leading from the bottom of the transmission casing 1. A check valve 114 is associated with said inlet. The outlet port has a conduit 115 connected thereto, the purpose of which will later appear.

In the bore part 110b is located a piston 116 that carries a roller 117 at its bottom end to ride on the periphery of an eccentric 118 fixed on the sleeve 92 as best shown in Fig. 6. This eccentric has been purposely omitted from Fig. 3 for the sake of clearness due to the peculiar development character of the view therein shown.

In the bore part 110a is a yieldable piston-like head 119 against which the piston 116 works, there being a cushion spring 120 between said piston and head. The top end of the bore part 110a receives a vented plug 121 and between said plug and head is a second cushioning spring 122. It is apparent that as the piston 116 is reciprocated by the eccentric 118, it develops a pumping action which draws oil into the pump through the inlet 111 and discharges the same out through the outlet 112. Should too high a pressure develop in the pump, the head 119 is moved against the action of the spring 122 to relieve said pressure. In this movement of the head, the formation of an air cushion above said head is prevented by the vented plug.

The bracket of the pump 110 is formed on its rear side with a longitudinally extending relief cylinder 123, as best shown in Fig. 6, and this cylinder communicates with the outlet 112 by means of a port 124, as best shown in Fig. 5. In said cylinder is mounted a piston 125 that is backed up by a relatively heavy spring 126. The space in this cylinder, in advance of the piston of course, is filled with lubricant through the port 124 and the spring 126 operates against the piston to keep a constant pressure on said lubricant out through the conduit 115. Thus the discharge out through said conduit is with a steady pressure and without pulsation produced in accordance with the reciprocations of the piston 116.

As before stated, the various speeds of the transmission are obtained in response to movement of the accelerator pedal through a vacuum as the actuating force. This vacuum however, is what I term a "blended vacuum" because its force or actuating power is a combination or blend of that produced in the inlet manifold of the engine and by a pump actuated or driven by a part of the transmission itself.

In the lower speed range of the engine, the vacuum produced in the inlet manifold of the engine is relatively high and will increase with engine speed when the latter is not under load. However, at the higher engine speeds when the engine is under a load, the vacuum diminishes. To retain a substantially constant degree of vacuum for the effective automatic operation of the transmission, I also employ a vacuum producing means that is driven by a part of the transmission. In such a means, the vacuum increases with the speed of said transmission part and will counteract the falling vacuum effect produced in the manifold of the engine at its higher ranges when under load.

I find it convenient to embody such a pump directly in the transmission and I employ in this instance certain meshing gears in the transmission as parts of a so-called gear pump.

As best shown in Figs. 2 and 4, a bracket 127 is fixed to the inside of the casing wall 6 to the rear of the plane of the gear 34. In said bracket is journalled a stub shaft 128 that carries an idler pinion 129 that meshes with and is driven by the said gear 34. This bracket includes a hood 130 that encloses portions of the gear 34 and pinion 129 from above so as to form a suction chamber in connection with portions of said gear and pinion. Connected to the rear side of this hood is a conduit 131 the purpose of which will soon appear. It is apparent that in the rotation of said gear and pinion a vacuum is produced in the hood and conduit. This vacuum of course, is in proportion to the speed of rotation of said gear and pinion.

Supported on the wall 5 of the casing, forward of the plane of the gear 34 is a valve 132 the purpose of which is to distribute the pressure fluid to the various clutches 20, 59 and 89 for shifting them in the proper direction, in proper sequence whereby the associated gears may be connected to and disconnected from their associated shafts.

The distributing valve 132 includes a barrel 133 disposed inside the wall 5 and a substantially semi-circular casing 134 disposed outside of said wall. The outer end of said casing is closed by a plate 135 with which is associated a cover 136. On the plate are mounted fixed contacts 135a (see Fig. 11) one for each speed produced by the transmission.

The barrel 133 is provided with an axial bore 137 and an outer annular bore 138 and in the axial bore is located a turnable valve plug 139 that has a stem 140 that projects outwardly through the casing 134 and through the plate 135.

Secured to that portion of the stem 140 within the casing 134 is a vane 140a that is capable of swinging through an arc of about 180° in length in said casing. Secured to that end of the stem 140 within the cover is a spring contact finger 140b (see Fig. 13) for a wiping engagement with the contacts 135a. As before stated, there is one of such contacts for each forward speed of which the transmission is capable and when the transmission is in any one of such forward speeds, the contact finger 140b is in engagement with the contact 135a associated therewith.

As shown in Fig. 7, there is mounted on the instrument board 141 of the vehicle a plurality of illuminable indicators 141a, one for each forward speed of which the transmission is capable and one associated with each contact 135a on the plate 135. Thus when the transmission is in a certain speed, the finger 140b is in engagement with the contact 135a associated with that speed. This closes a circuit to the corresponding indicator 141a which becomes illuminated and visually indicates to the operator, the speed provided by the transmission.

In the annular bore 138 is located a ported valve sleeve 142 which is of an axial length less than that of said bore. Said valve sleeve which is capable of a limited turning movement in the bore, is also capable of a limited endwise movement in said bore. A spring 143 is operatively associated with the inner end of the sleeve and normally tends to urge the same outwardly in its associated bore. In the bottom portion of the casing 134 is provided a passage 144 which not only communicates with the inner end of the bore 138 (see Fig. 11) but also communicates with a chamber 145 (see Fig. 30) formed in the bottom of the casing 134. The chamber 145 communicates with the interior of the casing by means of ports 145a and 145b disposed in one side of the bottom of the casing. Associated with said ports are threaded, adjustable valve stems 145c—145d. In the other side of the bottom of the casing is a port 145e that opens to atmosphere.

The passage 144 has connected thereto one end of a conduit 146, the other end of which is connected to the inlet manifold 4 of the engine 3. In said conduit is provided a valve 147 which may be manually opened and closed from a position convenient for the driver. As shown in Fig. 1, said valve includes an actuating arm 147a to which is connected one end of a Bowden wire 148, the other end of which has a button 148a thereon, arranged on the front face of the instrument board. This valve remains open when the vehicle is in operation and is only closed when it is desired to run the engine as when the vehicle is parked or is otherwise at a standstill. It is apparent that when the engine is in operation and the valve 147 is open, the engine suction in the manifold is manifested throughout the conduit 146 and consequently in the casing 134. By means of the valve stems 145c—145d, the effective area of the ports 145a—145b may be determined to adjust the vacuous condition in the chamber of the casing to one providing the most efficient operation.

The outer end of the bore 138 is closed by a disc 149 which carries a longitudinal pin 149a that engages in a recess 150 (see Fig. 26) in the valve sleeve 142. When this disc is turned in one direction or the other, as will later appear, it is apparent that a turning movement is transmitted to the valved sleeve. The pin 149a is so proportioned in length with respect to the recess 150 as to limit the valve sleeve in its outward longitudinal movement.

On the outer end of the valve plug 139 is a head 151 with an annular groove 151a thereon. This head is of such diameter as to engage the disc 149 and hold the assembly together in the desired relation. The valve plug 139 is provided near its inner end with an annular groove 152 and at a point between said groove and the disc 151, is further provided with a longitudinally extending flat face 153. Axially in said plug are inner and outer passages 154 and 155 respectively. The passage 154 opens at its inner end by a port 154a into the annular groove 152 and opens at its outer end laterally through the side of the valve plug by means of a port 154b arranged at a plane spaced 90° in a clockwise direction from the plane of the port 154a. The passage 155 opens at its inner end into the flat space 153 by means of a port 155a and opens at its outer end through the end of the valve plug, the ports 155a and 154a being disposed in the same radial plane.

The plug 139 is further provided at a point between the disc 151 and flat spot 153 with recesses 157 and in the periphery of the valve sleeve 142 is located a similar recess 158, best shown in Fig. 15. There are four of the recesses 157 in the plug, one for each speed of which the transmission is capable and these recesses are spaced at equal arcuate distances apart within 180° of the circumference of the valve plug as best shown in Fig. 14.

These recesses have associated therewith locking pins 160 and 161 respectively (see Fig. 11). Said pins are carried by a piston 162 disposed in a cylinder bore 163 formed in a block-like bracket 164 that is bolted onto the top side of the barrel 133. A spring 162a (see Fig. 11) working under the piston normally tends to urge the same upwardly to lift the pins 160—161 out of their associated recess 157—158 to release the valve plug 139 and valve sleeve 133 for movement. The block-like bracket 164 includes a lateral tubular extension 165 to which is secured a T-fitting 166 as shown in Fig. 2. In said extension is a passage 167 that opens into the bore 163. Also in said extension is a transversely disposed valve stem 168 with a cross port 168a (see Fig. 16) therein. When the valve stem is in one position, its port 168a registers with the passage 167 so that fluid under pressure may pass into the bore 163 to depress the piston 162. This causes the pins 160 and 161 to engage their associated recesses in the plug 139 and sleeve 133 to yieldingly hold them against movement. When the valve stem 168 is in its other position, its port is out of register with the passage 167 so that this closes off the passage 167 against entrance of pressure fluid into the bore 163.

The valve stem 168 has secured thereto, one end of a Bowden wire 169, the other end of which extends through the instrument board 141 and is there provided with a button 169a for actuating the same. The T-fitting 166 has secured thereto the other end of the conduit 115 before referred to, as connected to the pump 110.

The annular part 170 of the barrel 133 between the bore 137 and 138 is provided with a longitudinal passage 171 that is closed at its ends. This angular part is also provided with a plurality of radial ports 172—173—174 and 175 respectively. The port 172 opens through the midportion of passage 171 and connected to the rear end of the passage is a second port 172a.

The valve sleeve 142 is provided with longitudinal passages 176—177—178 and 179 respectively, all of which open through the outer end of the sleeve valve and open through the periphery of the valve sleeve at their rear end by means of suitable radial ports.

This valve sleeve is provided with a front set of five radial ports 180, 181, 182, 183 and 184 respectively (see Fig. 20) and is also provided with a rear set of four radial passages 185, 186, 187 and 188 respectively. Between the ports 185—186, 188 said valve sleeve is provided with an annular recess 189, all as best shown in Fig. 17. The passage 177 opens into said recess 189.

The ports mentioned are spaced apart longitudinally a distance substantially equal to that of the ports in the annular part of the shell 133. Thus when the valve sleeve has been moved outwardly by its spring 143, its ports are out of longitudinal register with those in the annular part 170 of the shell, but are in longitudinal register with said last mentioned ports when in its innermost position in the associated bore.

The shell 133 is provided on its top side with a set of fittings 190, 191, 192 and 193 respectively and a second set of fittings 194, 195 and 196 respectively for the attachment and for the leading in and out of certain conduits to and from the valve ports and passages in the sleeve 142. The fittings 191 and 194 have the conduits 108 and 107 connected thereto, the fittings 192 and 190 have the conduits 77, 78 connected thereto, while the fitting 196 has the conduit 131 that leads from the vacuum pump 130 connected thereto. The fitting 195 has one end of a conduit 197 connected thereto and the other end of this conduit is secured in the T-fitting 166 before mentioned. The other fitting 193 has one end of a conduit 198 connected thereto, the other of which is connected to another valve 199 secured to the side wall 5 forwardly of the valve 132.

The valve 199 includes a cylinder 200 that extends through the casing wall 5 so as to have a part thereof arranged inside the transmission casing and a part thereof arranged outside the casing. This cylinder is provided on its top side with fittings 201—202 and 203 respectively, the fittings 201—202 receiving the associated ends of the conduits 28 and 29 before mentioned and the fitting 203 receiving the associated end of the conduit 198. Opening into the bottom of the casing is a conduit 204 that leads toward the bottom end of the transmission casing and in said valve casing is a ball check valve 205 (see Fig. 9) that controls the inlet of the lubricant that is used as a pressure fluid into the casing 200. In the inner end wall of the casing 200 are ports 200a—200b respectively, see Fig. 8.

In the inner end of the valve casing 200 is located a turnable valve disc 206 having three ports 206a—206b and 206c therein (see Fig. 10). All of these ports open at one end through the periphery of the disc. The port 206b can open to either port 200a—200b, according to the position into which the valve disc has been turned and the ports 206a and 206c open at their inner end through the inner face of the valve disc so as to communicate with the interior of the casing 200.

When the disc is turned in one direction, this brings two ports 206a—206b into communication with the conduits 28—29 and when said disc is turned in the other direction, this brings the ports 206b and 206c into communication with said conduits. The position of the valve disc thus controls the passage of fluid under pressure to produce the shifting of the clutch 20, so as to lock out or lock in the free wheeling clutch 21. The valve disc 206 is provided with an axial extension 207 that projects through the inner end wall of the casing and is there provided with arms 207a, 207b as best shown in Fig. 8. These arms are actuated to turn the valve disc in the desired direction as will soon appear.

In the outer end of the valve casing 200 is provided a cup-like piston 209 and between the piston and disc is located a spring 210 that normally tends to move the piston outwardly in the casing. When the piston is moved inward and outward in the casing with a reciprocating movement, it establishes a pumping action in the valve casing 200 to draw lubricant from the transmission casing 1, into the casing 200 and the pressure fluid discharges out through that conduit 28 or 29 that happens to be open.

To move the piston 209 inwardly, this is done manually by means of a foot pedal 211 (see Fig. 1) that takes the place and position of the ordinary clutch pedal in an automobile having a conventional type of clutch. This pedal is pivoted as at 212 on the casing 1 and is provided with an arm 212a to which one end of a link 213 is operatively connected. The other end of said link is connected to an arm 214a of a bell crank lever 214 that is pivoted as at 215 to a suitable boss on the flange at the front end of the casing 1. The other arm 214b (see Fig. 2) of said bell crank lever is so formed as to be engaged with the piston 209. When the pedal 211 is depressed, this through the connections before mentioned, pushes the piston 209 inwardly of the casing 200 on its compression stroke and when pressure is released on said pedal, the spring 210 forces the piston outwardly on its suction stroke. A few actuations of the pedal thus draws lubricant from the transmission casing into the valve casing 200 and forces it into that conduit 28—29 that happens to be open. This lubricant then passes into the associated passage 48 to shift the clutch 20 to connect the shaft 17 to the shaft 10, either through or independent of the overrunning clutch 21.

The purpose for this arrangement is as follows:

When the engine is not running and the vehicle is standing still, there is no pressure in the hydraulic system of the transmission so that all clutches are in neutral. Thus, there is no driving connection of any sort between the shafts 10 and 14. Now should the engine starter fail to function in starting the motor and should hand cranking also fail to start the engine, all other engine conditions being normal, towing or pushing the automobile would be the next resort. As all clutches are in neutral, towing of the vehicle would turn the shaft 14 but as the shaft 14 is not connected to the shaft 10, nothing would result therefrom. By pumping the pedal 211 a few strokes, lubricant is pumped from the transmission casing into the open passage 48 to shift the clutch 20 out of neutral into one of its positions which will connect the shaft 17 to the shaft 10, independent of the free wheeling clutch. Thus, the shaft 14 is positively connected to the shaft 10 through the shaft 17 so that power is applied to the shaft 10 to turn or crank the engine under a tow or push.

As before mentioned, the valve sleeve 142 is capable not only of an endwise movement under the action of manifold suction but is also turnable in one direction or the other to provide any forward speed or reverse. In this instance, the turning of the valve sleeve in either direction is produced during actuation of an accelerator pedal 216 (see Fig. 1). To the toe end of said lever is connected one end of a link 217. This link extends through the toe board and its other end 217a extends through one end of a lever arm 218 that is pivoted on a lateral stud 219 on the casing 1. The link end 217a engages an arm 220 that is pivoted at one end of the casing 1 as at 221 and has a link 222 pivoted to its other end.

Also pivoted on the stud 219 is a bell crank having arms 223 and 224. The arm 223 is connected by a link 225 to the heel end of the pedal and a spring 225a is so associated with said link as to exert an upward lift on the heel end of the pedal. The arm 224 has one end of a link 226 connected thereto. 227 indicates the throttle actuating rod for the carburetor 228 of the engine and said rod is connected to the pedal by suitable means (not shown) so that whenever the toe end of the pedal is depressed, movement is imparted to the rod 227 to open the throttle and accelerate the engine.

Extending inwardly from the side wall 5 of the casings at a point between the valve casings 132 and 200 respectively, and arranged in a plane above the axes thereof, is a tubular bearing member 229 (see Fig. 2) which forms the support for a rock shaft 230 and a surrounding rock shaft sleeve 231. On the outer end of the shaft 230 is fixed an arm 232 and on the outer end of the sleeve 231 is fixed a second arm 233 and these arms are connected to the other end of the links 226 and 222 before mentioned. Thus when the toe end of the pedal 216 is depressed this not only causes engine acceleration, but it also rocks the sleeve 231 and when the heel end of said pedal is depressed, it rocks the shaft 230.

On the inner end of the sleeve within the casing 1 is fixed an arm 234 and on the like end of the shaft 230 is fixed a shorter arm 235 that carries a stud 235a at its bottom end. 236 indicates a bell crank lever (see Fig. 8) that includes a relatively short power arm 237 and a relatively long load arm 238. This lever is pivoted at the junction of its arms upon a pin 239 carried at the bottom end of the arm 234 before mentioned. The top end of the power arm 237 is formed as a projection 237a to be engaged by the stud 235a on the arm 235.

The free end of the load arm 238 extends into the vicinity of the control valve 132 and there carries a pin 238a that engages in a slot 149b in the disc 149 of said valve. This slot which is made concentric with the pin 239 when the arm 234 is in its normal position, extends at its ends into planes above and below the axis of the valve 132 as best shown in Fig. 8. A spring 240 is fixed at one end to a pin on the disc 149 and is fixed at its other end to the block-like bracket 164 and this spring acts through the disc 149 and its pin 149a to turn the valve sleeve to its neutral position, when other forces in opposition thereto have ceased.

In the depression of the toe end of the pedal 216, this will swing the arm 234 counterclockwise as viewed in Fig. 8 and will move the lever 236 as a whole toward the right. By reason of the pin 238a and slot 149b, this movement of the lever is translated into a rocking movement of the valve sleeve 142 also in a counterclockwise direction through the disc 149 and its pin 149a. This sets the various ports in the valve sleeve 142 to permit the passage of fluid under pressure to the desired shaft clutches to provide the desired speed forward.

When the heel end of the pedal 216 is depressed, this causes a counterclockwise movement of the arm 235. In the initial part thereof, the engagement of the stud 235a with the part 237a of the arm 237 will tend to first swing the lever 236 as a whole in a clockwise direction about the pin 239 as an axis. This will lift the free end of the arm 238 upwardly and the pin 238a will swing toward the top end of the slot 149b. When the toe end of the pedal 216 is depressed to again accelerate the engine, the arm 234 acts through the bell crank 236 to turn the disc 149 and valve 142 to set the valve 132 as a whole to provide the reverse speed of the transmission.

As before stated, when a vacuous condition is effected in the chamber 135, the vane 140a (see Fig. 30) swings counterclockwise and turns the valve stem 139 in the same direction and when this vacuous condition ceases, the valve stem 139 is returned to its normal position as follows:

At one point in the groove 151a of the head 151 of said valve stem is fixed one end of a cable 241, the other end of which is fixed to a spring 241a operatively connected to the power arm 237 of the lever 236 as best shown in Figs. 8 and 34. Thus when said vacuous condition ceases in the chamber 135, the spring 241a will act to return the valve plug 139 and the vane 140a to the normal position shown in Figs. 11 and 30.

The matter of driving the vehicle either in or out of free wheeling is optional and to that end I provide the following arrangement:

242 (see Fig. 8) indicates a rockable lever that is pivoted at a point between its ends on the pin 239 so as to provide arms 243 and 244 for said lever. The arm 244 has its free end reduced in dimension and is extended through a slot in a bracket 245 fixed on the inner end of the valve casing 199. The other arm 243 has connected thereto by a spring 245a, one end of a Bowden wire 246. The other end of said wire is connected to a button 247 on the instrument board as best shown in Fig. 7. This wire, of course, is enclosed in an associated sheath or tube in the usual manner. Adjacent said button is another button 248 connected to the throttle of the carburetor 228 for hand-acceleration of the engine.

Should it be desired to drive in free wheeling, it is only necessary to pull out on the button 247 and this through the wire 246 will rock the lever 242 clockwise into the dotted line position shown in Fig. 8. When the toe end of the accelerator is depressed and the arm 234 is swung counterclockwise, it will carry the lever 242 to the right so that the free end of its arm 244 will engage the arm 207b and will rock the valve disk 206. Thus fluid under pressure is admitted to the conduit 29 to pass through the passage 49 and out of the port 49c in front of the clutch 20 to shift the same rearwardly to connect the clutch member 43 to the shaft 17. Then the drive is from the shaft 10 through the free wheeling mechanism 21 to the shaft 17 and then to the shaft 14.

When it is desired to lock out free wheeling the button 247 is pushed inwardly and this through the wire 246 will swing the lever 242 back to the full line position in Fig. 8. Now when the toe end of the pedal 216 is depressed, this will swing the arm 234 counterclockwise and will carry the lever 236 and lever 242 toward the right. In this movement of said lever, the arm 244 will engage the arm 207a and turn the valve disc 206 so that fluid under pressure passes into the conduit 28, passage 48 and port 48c, to the rear of the clutch collar 20 to shift the same to the left. This will connect the shaft 10 through the disc 46 directly to the shaft 17. It is pointed out at this time that when the clutch member 20 is moving in either direction, the fluid under pressure will pass into one or the other of the passages 48 and 49 and will be delivered into the interior of the sleeve 32 which is thus assured of an ample supply of fluid in the form of a lubricant. When the clutch member 20 is moving in either direction, the fluid in front of it will return through the conduits 28—29 to the ports 200a or 200b, one of which at this time opens into the interior of the transmission casing.

In the operation of the mechanism described, when the engine is started, a vacuous condition is established in the manifold and a suction is exerted in the conduit 146 and in the chamber or casing 135 and this suction is in proportion to engine speed. As the gears of the transmission are all in constant mesh, the vacuum pump 130 and the fluid pressure pump 110 are both started into operation. As the conduit 131 from the vacuum pump 130 leads into the chamber or casing 135 by means of the port 145 it is apparent that the vacuous condition in the chamber is a blend of that from both the manifold and pump and is of a character or degree different from that in either the manifold or pump. It is also apparent that in the higher speed ranges of the engine under load, the vacuum in the manifold diminishes but such higher speed ranges of course, will drive the vacuum pump faster to increase its suction to compensate for the loss in efficiency of the manifold vacuum. Thus the vacuous condition in the chamber or casing 135 is controlled by a blended vacuum which is exerted to a greater degree with engine speeds under load.

Due to a partial depression of the toe end of the pedal 216, for acceleration into the lower engine speeds, this through the connections previously mentioned will turn the valve sleeve from the position shown in Fig. 12 to that shown in Fig. 20 and in which position it remains in all forward speeds afforded by the transmission. This vacuous condition is also felt at the inner end of the chamber or bore 138 and acts to move the valve sleeve 142 inwardly so that its ports and passages occupy a position with respect to those of the vave casing portion 170 and the valve plug 139, as shown in Figs. 20 and 25.

Thus fluid under pressure from the pump 110 passes through the controlling valve 132, through the conduit 77 to shift the clutch member 59, the fluid in advance of the clutch member passing out through the conduit and valve 132.

When a greater pressure is applied to the toe end of the pedal 216, this accelerates the engine and even though the manifold vacuum drops, that produced by the pump 130 increases and the increased suction produced thereby is manifested in the chamber 135. This pulls the vane 146a further in a clockwise direction to turn the valve plug 139 into the position shown in Fig. 21. With the valve plug in this position, fluid under pressure operates to shift the clutch member 89 forwardly to provide second speed forward. More foot pressure on the pedal 216 of course, further speeds up the engine and through the pump 130 this further swings the vane 146a counterclockwise to further turn the valve plug 139 into the positions shown in Figs. 22-27 so as to deliver fluid under pressure through the conduit 78 and passage 73 to shift the clutch member 59 to the right and this will provide third speed forward as before explained.

Still more foot pressure on the pedal 216 causes the production of a greater vacuum in the chamber 135 to turn the valve plug 139 into the position shown in Figs. 23-28 to provide fourth speed forward. When the engine slows down, the vacuum produced by the pump begins to drop and the vane 146 now starts to swing clockwise (in Fig. 30) and turns the valve plug 139 in a similar direction to drop back into third speed forward and so on.

Upon reacceleration of the engine, the vane swings in the opposite direction again to automatically provide the successive changes to the higher speeds. It is pointed out at this time that when in making a change from a lower speed to a next higher one, the clutch member providing such lower speed stays "in" until the clutch providing the next higher moves to operative position at which time, the lower speed clutch member automatically kicks out. This is due to the angular formation of the sides of the teeth of the clutch as shown in Fig. 32. Thus, there is no jerk in the transmission during the changing from one speed to the other and this is so in changing from a lower to a higher speed or from a higher to a lower speed.

When it is desired to go into reverse, the operator imposes a pressure on the heel end of the pedal 216 and this as before described, operates through the arm 235 to swing the load arm 238 of the lever 236 upwardly. This through the pin 238a operates to turn the disc 149 clockwise and because of the pin 149a a like movement is imparted to the valve sleeve 142 which turns into the position shown in Figs. 24-29. This permits pressure fluid to pass through the conduit 108 to the passage 104 and the clutch member 89 then moves into a position connecting the gear 87 to the shaft 90 when the drive is to the shaft 14 as before described. To move out of reverse, heel pressure is released on the pedal and the parts all return to neutral position.

Assume now that the automobile is about to descend a long steep hill where it is desired to employ the engine as a braking medium in the descent of the hill. When the foot is released from the toe end of the pedal 216, the engine becomes decelerated and drops its speed so that the transmission changes from high speed or direct drive back to third speed and possibly to second speed depending of course, upon deceleration and this is indicated at the indicators 141a. At this time, the button 169a is pulled out and the valve plug 168 is then caused to be moved so that its port 168a registers with the bore 163 in the bracket block 164.

Fluid under pressure then enters the bore 163 and depresses the piston 162 and forces the pins 160 and 161 into engagement with one of the recesses 157 in the plug 139 and the recess 158 in the valve sleeve 142. This locks said valve plug and said valve sleeve against movement so that the transmission remains locked in the lower speed, it being assumed of course, that the free wheeling mechanism is in its locked out condition.

When the descent of the hill has been made and it is again desired to accelerate the engine, the button 169a is pushed in to move the valve plug into the position shown in Fig. 16 and this removes the influence of the pressure fluid before the piston 162. The spring 162a now urges the piston 162 upwardly and this withdraws the locking pins from the recesses 157 and 158 and the valve plug 139 and sleeve 142 are again free to function under engine acceleration. As before pointed out as there are four of the recesses 157 in the valve plug 139, one for each speed of which the transmission is capable, it is apparent that the transmission can be locked in any one of the said speeds against automatic changing thereof.

It is apparent from the foregoing that the shifting of the various clutch members is carried out by a fluid under pressure and that this fluid is controlled by a valve which in itself is controlled by a mixed or blended vacuum provided in one part by the engine manifold and in another part by means driven through the transmission. Thus the variation in manifold vacuum affects the operation of the transmission, the real operating vacuum remaining substantially constant.

Should it be desired to run the engine at any speed as in tuning or warming up or for inspection, without affecting automatic operation of the transmission, it is only necessary to pull out the button 148a and this operates to close the valve 147 in the conduit 146, so that the transmission is cut off from all influence of engine operation.

The transmission which is simple in construction, eliminates the use of the conventional main clutch and its operating pedal as well as the conventional shift lever. This leaves fewer obstructions in the floor and reduces manufacturing costs.

While in describing the invention, I have referred in detail to the form, arrangement and construction of the various parts thereof, the same is to be considered only in the illustrative sense so that I do not wish to be limited thereto except as may be specifically set forth in the appended claims.

I claim as my invention:

1. In a transmission, the combination of a drive shaft, a driven shaft, means operable by fluid under pressure for operatively connecting said shafts together for rotation at any one of a number of relative speeds, a plurality of sources of vacuum which operate in a manner such that a decrease in the one source of vacuum is offset by an increase in the other, and means actuated by the vacuum from said sources for controlling the passage of fluid to said means for actuating the same in operatively connecting said shafts together in the desired relative speed.

2. In a transmission, the combination of a drive shaft, a driven shaft, means operable by fluid under pressure for operatively connecting said shafts together for rotation at any one of a number of relative speeds, a plurality of sources of vacuum, a valve for controlling the passage of said fluid under pressure, and means connected to said valve actuated by said vacuum from said sources for controlling the passage of fluid to said means for actuating the same in operatively connecting said shafts together at the desired relative speed.

3. In a transmission, the combination of a drive shaft, a driven shaft, means for operatively connecting said shafts together for rotation at any one of a number of relative speeds, an engine for driving the drive shaft and including a manifold providing a source of vacuum, means operatively driven from the drive shaft and providing a second source of vacuum, and means actuated by the vacuum from the manifold and from said second source for actuating said means for operatively connecting said shafts together at the desired relative speed.

4. In a transmission, the combination of a drive shaft, a driven shaft, means operable by a fluid under pressure for operatively connecting said shafts together for rotation at any one of a number of relative speeds, an engine for driving the drive shaft and including a manifold providing a source of vacuum, means operatively driven from the drive shaft and providing a second source of vacuum, a valve for controlling the passage of said fluid under pressure, and means connected to said valve actuated by the vacuum from said sources for actuating said valve so as to direct said fluid under pressure to said means for connecting said shafts together at the desired relative speed.

5. In a transmission, the combination of a drive shaft, a driven shaft, means for operatively connecting said shafts together for rotation at any one of a number of relative speeds, an engine for driving the drive shaft and including a manifold providing a source of vacuum, means providing a second source of vacuum and driven from a part of the transmission, means for blending the vacuum from the manifold with the vacuum from said means providing the second source thereof, and means actuated by the blended vacuum for actuating said means for connecting said shafts together at the desired relative speeds.

6. In a transmission, the combination of a drive shaft, a driven shaft, means including movable members for operatively connecting said shafts together for rotation at any one of a number of relative speeds, a plurality of sources of vacuum, which operate in a manner such that a decrease in the one source of vacuum is offset by an increase in the other fluid under pressure for moving the desired movable member to connect said shafts together in the desired relative speed, and means actuated by the vacuum from said sources for controlling the passage of the fluid to the desired movable member to move the same to connect said shafts together.

7. In a transmission, the combination of a drive shaft, a driven shaft, means including shiftable clutch members for operatively connecting said shafts together for rotation at any one of a number of relative speeds, a plurality of sources of vacuum, fluid under pressure for causing a shift of the desired clutch member to connect the shafts together at the desired relative speed, and means actuated by the vacuum from said sources for controlling the passage of the fluid to the desired clutch member to shift the same to provide the desired relative speed between said shafts.

8. In a transmission, the combination of a drive shaft, a driven shaft, means including shiftable clutch members for operatively connecting said shafts together for rotation at any one of a number of relative speeds, an engine for driving the drive shaft and including a manifold providing a source of vacuum, a second source of vacuum arranged within and driven by a part of the transmission, means for causing a shift of the desired clutch member to connect said shafts together at the desired relative speed, means for blending the vacuum from the manifold with the vacuum from said second source, and means actuated by the blended vacuum for controlling the shifting of the desired clutch member to provide the desired relative speed between said shafts.

9. In a transmission, the combination of a drive shaft, an engine including an inlet manifold for driving the drive shaft, a driven shaft, movable means for connecting said shaft together for rotation at any one of a number of different relative speeds, a vacuum pump driven from the transmission, means providing a source of fluid under pressure for moving the desired movable member to connect said shafts together at the desired relative speed, and means actuated by the vacuum from said manifold and pump respectively for controlling the passage of said fluid under pressure for moving the desired movable member.

10. In a transmission, the combination of a drive shaft, an engine including an inlet manifold for driving the drive shaft, a driven shaft, means for operatively connecting said shafts together for rotation in any one of a number of relative speeds, a vacuum pump driven from the transmission, means actuated by the vacuum from said manifold and pump respectively for actuating said means for operatively connecting said shafts together in the desired relative speed, and other means independent of said vacuum for connecting said shafts together in at least one of said speeds.

11. In a transmission, the combination of a drive shaft, a driven shaft, fluid pressure actuated means for operatively connecting said shafts together for rotation in any one of a number of relative speeds, a plurality of sources of vacuum which operate in a manner such that a decrease in the one source of vacuum is offset by an increase in the other, means actuated by the vacuum from said sources for actuating said fluid pressure actuated means for operatively connecting said shafts together in the desired relative speed, and other means operable through said fluid for connecting said shafts together in one of said speeds.

12. In a transmission, the combination of a drive shaft, a driven shaft, fluid pressure means for operatively connecting said shafts together for rotation in any one of a number of relative speeds, an engine for driving the drive shaft and including a manifold providing a source of vacuum, a fluid pressure pump driven from the transmission, a second source of vacuum also driven from the transmission, means actuated by the vacuum from said sources for controlling the passage of fluid under pressure to said means for actuating the same in operatively connecting said shafts together in the desired relative speed, and means for closing off the vacuum from said manifold.

13. In a transmission, the combination of a drive shaft, a driven shaft, an intermediate shaft, means for connecting the intermediate shaft to and for disconnecting the same from the drive shaft, a traveler on the intermediate shaft, means connected to the driven shaft and driven from the drive shaft for causing a movement of said traveler on said intermediate shaft, and means providing a hydraulic cushion for connecting said second mentioned means to the intermediate shaft when said traveler reaches the end of its movement on said intermediate shaft.

14. In a transmission, the combination of a drive shaft, a driven shaft, an intermediate shaft, means for connecting the intermediate shaft to and for disconnecting the same from the drive shaft, a traveler on the intermediate shaft, means connected to the driven shaft and driven from the drive shaft for causing a movement of said traveler on said intermediate shaft, means providing a hydraulic cushion for connecting said second mentioned means to the intermediate shaft when said traveler reaches the end of its movement on said intermediate shaft, and means providing a second cushion for augmenting the hydraulic cushion.

15. In a transmission, a casing containing a lubricating fluid, a drive shaft and a driven shaft, a third shaft in said transmission and constantly driven by said drive shaft, fluid pressure actuated means for connecting said drive and driven shafts together at any one of a number of relative speeds, a pump driven by said third shaft for withdrawing a part of the lubricating fluid from the casing and for delivering it under pressure to said fluid pressure actuated means, a source of vacuum driven by said third shaft, a second source of vacuum and means actuated by the vacuum from both sources for controlling the passage of fluid under pressure to said fluid pressure actuated means for connecting said shafts together in the desired relative speed.

16. In a transmission, the combination of a drive shaft, a driven shaft, means including movable members providing an operative connection between said drive shaft and said driven shaft for driving the latter from the former in any one of a number of relative speeds therebetween, means providing a fluid under pressure for moving the desired movable member from a neutral to an operative position, means providing a plurality of sources of vacuum which operate in a manner such that a decrease in the one source of vacuum is offset by an increase in the other, and means actuated by the combined action of vacuum from said sources for controlling the passage of fluid under pressure to the desired movable member.

17. In a transmission, the combination of a drive shaft, a driven shaft, means operable by fluid under pressure for operatively connecting said shafts together for rotation in any one of a number of relative speeds in the same direction and also for rotation in at least another relative speed in an opposite direction, a plurality of sources of vacuum which operate in a manner such that a decrease in the one source of vacuum is offset by an increase in the other, and means actuated by said vacuum from said sources for controlling the passage of fluid to said means for actuating the same in operatively connecting said shafts together in the desired relative speed in the same direction or in said another relative speed in the opposite direction.

18. In a transmission, the combination of a tubular driving member, a driven shaft therein, a driven member on said shaft and having clutch teeth, a shiftable clutch for connecting said driven member to said shaft, means for shifting said clutch, and means independent of the clutch and operable after said clutch has been actuated to clutch the driven member to said shaft for connecting the driven shaft to the driving member with a cushioning action, said last mentioned means including a traveler on the driven shaft and having a splined engagement with the tubular driving member and further including a cushioning element between said driving member and said traveler.

19. In a transmission, the combination of a tubular driving member, a driven shaft therein, a driven member on said shaft and having clutch teeth, a shiftable clutch on the driven shaft for engaging said teeth for connecting said driven member to said shaft, and means independent of said clutch and actuated in a relative rotation between said driven shaft and the driving member for connecting them together with a cushioning action said last mentioned means including a traveler on the driven shaft and having a splined engagement with the tubular driving member and further including a cushioning element between said driving member and said traveler.

20. In a transmission, the combination of a tubular driving member, a driven shaft therein, a driven member on said shaft and having clutch teeth, a pressure fluid shiftable clutch on the driven shaft for engaging said teeth for connecting said driven member to said shaft, and pressure fluid means independent of said clutch operable in a relative rotation between the driven shaft and the driving member for connecting them together with a cushioning action, said last mentioned means including a traveler on the driven shaft and having a splined engagement with the tubular driving member and further including a hydraulic fluid operating between said tubular driving member and said traveler.

21. In a transmission, the combination of a tubular driving member, a driven shaft therein, a driven member on said shaft and having clutch teeth, a shiftable clutch on the driven shaft for engaging said teeth for connecting the driven member to the driven shaft, a device on said driven shaft independent of said clutch and engaged with the driving member and having a splined connection with the tubular driving member so as to be longitudinally movable in a relative rotation between said driven shaft and driving member, and means confined in said tubular driving member and associated with said device for imposing a resistance to the longitudinal movement of the device to provide a cushioned driving connection between said driven shaft and said driving member.

22. In a transmission, a drive shaft, a driven shaft, a pair of auxiliary shafts, a member loose on each auxiliary shaft for transmitting power to the driven shaft, a gear loose on each auxiliary shaft and driven from the drive shaft, a fluid pressure shiftable clutch associated with each member for operatively connecting it to its associated auxiliary shaft, a pressure fluid conduit leading to each clutch member, a valve common to said conduits for controlling the passage of fluid therethrough to the associated clutch member for shifting the same, vacuum operated means for moving the valve to select the desired conduit for the passage of fluid thereto, and means between each auxiliary shaft and the gear loose thereon and operable in a relative rotation therebetween for connecting the said gear to its associated shaft with a cushioning action.

23. In a transmission, a drive shaft, a driven shaft, a third shaft between and aligned with said drive shaft and said driven shaft, a pair of auxiliary shafts, a member loose on each auxiliary shaft and operatively connected to the driven shaft to transmit power thereto, a gear loose on each auxiliary shaft and driven from the drive shaft, a fluid pressure shiftable clutch associated with each member for drivingly connecting it to its associated auxiliary shaft, a third fluid pressure shiftable clutch for connecting the third shaft to the drive shaft, means for delivering fluid under pressure to the desired clutch to connect either member to its associated auxiliary shaft or to connect the third shaft to the drive shaft, a fluid pressure conduit leading to each clutch member, a valve common to all of said conduits for controlling the passage of fluid therethrough to the associated clutch for shifting the same, vacuum operated means for moving the valve to select the desired conduit for the passage of fluid therethrough, means between each auxiliary shaft and the gear loose thereon and operable in the relative rotation therebetween for connecting the gear to its associated auxiliary shaft with a cushioning action, and means operating automatically when the third shaft is connected to the drive shaft for connecting said third shaft to the driven shaft.

24. In a transmission, a drive shaft, a driven shaft, a pair of auxiliary shafts, means normally disconnected from each auxiliary shaft for transmitting power to the driven shaft, a member rotative on each auxiliary shaft and driven from the drive shaft, a device associated with each means for connecting the same to its associated auxiliary shaft, means common to said devices for actuating the desired device to connect its associated means to its associated auxiliary shaft, and means between each auxiliary shaft and the member loose thereon and operating in a relative rotation therebetween for providing a hydraulic cushion during connection therebetween.

25. In combination with an engine having an inlet manifold, a transmission including a drive shaft operatively connected to the engine, a driven shaft, fluid pressure operable means for connecting said shafts together at any one of a number of different speed ratios, a pump operative to produce a vacuum when the drive shaft is being engine driven, a valve for controlling the passage of fluid under pressure to said means, and means for operating the valve and actuated by the blended vacuum of said pump and inlet manifold respectively of the engine.

26. In combination with an engine having an inlet manifold, a transmission including a casing and a driven shaft operatively connected to the engine, means driven from a part of the transmission for supplying a fluid under pressure, a vacuum pump driven from the transmission, fluid pressure operable means for connecting said shafts together at any one of a number of different speed ratios, and a valve for controlling the passage of fluid under pressure to said fluid pressure operable means and actuated by the blended vacuum of said pump and manifold respectively.

27. In combination with an engine, a pedal for accelerating and decelerating the same, a transmission including a drive shaft, a driven shaft, a plurality of fluid pressure operable means for connecting said shafts together at any one of a number of speed ratios forward and in at least one speed ratio in reverse, means providing a source of vacuum, a valve for controlling the passage of fluid under pressure to the desired fluid pressure operable means for connecting said shafts together at the desired speed ratio forward or in reverse, and means operable in the actuation of the pedal for setting the valve for operation by said vacuum to control the passage of fluid under pressure to the means operable thereby to provide the desired speed in forward or in reverse.

28. In combination with an engine having an inlet manifold, a pedal for accelerating and decelerating the engine, a transmission including a drive shaft operatively connected to the engine, a driven shaft, a plurality of fluid pressure operable means for connecting said shafts together at any one of a number of speed ratios forward and in at least one speed ratio in reverse, means driven from a part of the transmission for providing a fluid under pressure, a vacuum pump also driven from a part of the transmission, a valve for controlling the passage of fluid under pressure to the desired fluid pressure operable means for connecting said shafts together at the desired speed ratio forward or in reverse, and means operable in the actuation of the pedal for setting the valve for operation by a vacuum blended from those from said inlet manifold and pump respectively to control the passage of fluid under pressure to the means operable thereby to provide the desired speed ratio in forward or reverse.

29. In a transmission, the combination of a drive shaft, a driven shaft, means for operatively connecting said shafts together at any one of a number of relative speeds, a plurality of sources of vacuum, means actuated by said vacuum from said sources for actuating said means for operatively connecting the said shafts together in the desired relative speed, and means also actuated by said vacuum from said sources for visibly indicating the relative speed at which said shafts are operatively connected.

30. In a transmission, the combination of a drive shaft, a driven shaft, means operable by fluid under pressure for operatively connecting said shafts together for rotation at any one of a number of relative speeds, a source of sub-atmospheric pressure, a valve for controlling the passage of said fluid under pressure, and means for actuating the valve in operatively connecting said shafts together at the desired relative speed, comprising a movable actuating member for said valve, and a casing in which said member is arranged for movement, said casing being connected to said source of sub-atmospheric pressure at a point to one side of said member and being connected to a source of pressure higher than said sub-atmospheric pressure at a point to the other side of said member.

31. In a transmission, the combination of a drive shaft, a driven shaft, means operable by fluid under pressure for operatively connecting said shafts together for rotation at any one of a number of relative speeds, a source of sub-atmospheric pressure, a turnable valve for controlling the passage of said fluid under pressure, and means for turning the valve in the proper direction in operatively connecting said shafts together at the desired relative speed, comprising a turnable actuating member connected to said valve and a casing in which said member is mounted for turnable movement, said casing being connected to said source of sub-atmospheric pressure at a point to one side of said member and being connected to a source of pressure higher than said sub-atmospheric pressure at a point to the other side of said member.

SWAN GEORGE SWANSON.